United States Patent [19]

Koziol

[11] Patent Number: 5,195,425
[45] Date of Patent: Mar. 23, 1993

[54] ROTISSERIE HEAT DIRECTING DEVICE

[75] Inventor: Walter Koziol, Antioch, Ill.

[73] Assignee: Modern Home Products Corp., Antioch, Ill.

[21] Appl. No.: 873,325

[22] Filed: Apr. 24, 1992

[51] Int. Cl.⁵ .................................. A47J 37/04
[52] U.S. Cl. ........................ 99/421 H; 99/447; 126/41 R
[58] Field of Search ............. 99/401, 419, 421 R, 99/421 H, 421 HH, 421 HV, 421 V, 447; 126/4, 41 R–41 E, 29; 454/306, 307

[56] References Cited

U.S. PATENT DOCUMENTS

| | | |
|---|---|---|
| 739,214 | 9/1903 | Phillips ................. 126/41 R |
| 902,945 | 11/1908 | Day ................. 99/421 HH |
| 1,211,086 | 1/1917 | Child . |
| 1,517,179 | 11/1924 | Thurgood ................. 454/307 |
| 1,622,031 | 3/1927 | Elters ................. 454/307 |
| 1,639,605 | 8/1927 | Guy-Pell . |
| 1,702,900 | 2/1929 | Humphrey ................. 99/447 |
| 1,782,639 | 11/1930 | Van Allen ................. 99/421 R |
| 1,964,372 | 6/1934 | Tygart . |
| 2,596,329 | 5/1952 | Egbert ................. 99/401 |
| 2,891,465 | 6/1954 | Rogge ................. 99/401 |
| 3,062,127 | 11/1962 | Lang ................. 99/401 |
| 3,195,442 | 7/1965 | Russell ................. 126/41 R |
| 3,358,587 | 12/1967 | Hunt et al. . |
| 3,359,883 | 12/1967 | Murphy ................. 454/306 |
| 3,363,543 | 1/1968 | Roberts et al. ................. 99/421 HV |
| 3,547,097 | 12/1970 | Rice et al. . |
| 3,648,594 | 3/1972 | Hundhausen ................. 99/447 |
| 3,832,989 | 9/1974 | Belford ................. 99/447 |
| 4,089,258 | 5/1978 | Berger ................. 99/339 |
| 4,150,610 | 4/1979 | Ferrara ................. 99/421 H |
| 4,561,418 | 12/1985 | Cairns . |
| 4,619,190 | 10/1986 | Smith ................. 99/393 |
| 4,627,410 | 12/1986 | Jung ................. 126/41 R |
| 4,697,506 | 10/1987 | Ducate, Jr. ................. 99/482 |
| 5,009,151 | 4/1991 | Hungerford ................. 99/446 |

FOREIGN PATENT DOCUMENTS 2745252 4/1979 Fed. Rep. of Germany ........ 99/401
570022 12/1957 Italy ................. 99/421 H Primary Examiner—Harvey C. Hornsby
Assistant Examiner—Mark Spisich
Attorney, Agent, or Firm—Quarles & Brady

[57] ABSTRACT

A device for directing heat from a heat source in a barbecue grill to food on a rotisserie. The heat directing device has a base portion for placement over a heat source and a hollow duct extending from the base portion which terminates in an opening directed at the rotisserie. In one embodiment, there are two oppositely positioned ducts to direct heat to both the front and back of the food to be cooked. In another embodiment, there are louvers in the base portion so as to allow some heat to escape the base portion and cook the food from the underside. The base portion and duct are adjustable in a lateral manner to fit various sizes of barbecue grill bases. The heat directing device is especially suited for a gas fired barbecue grill unit.

20 Claims, 3 Drawing Sheets

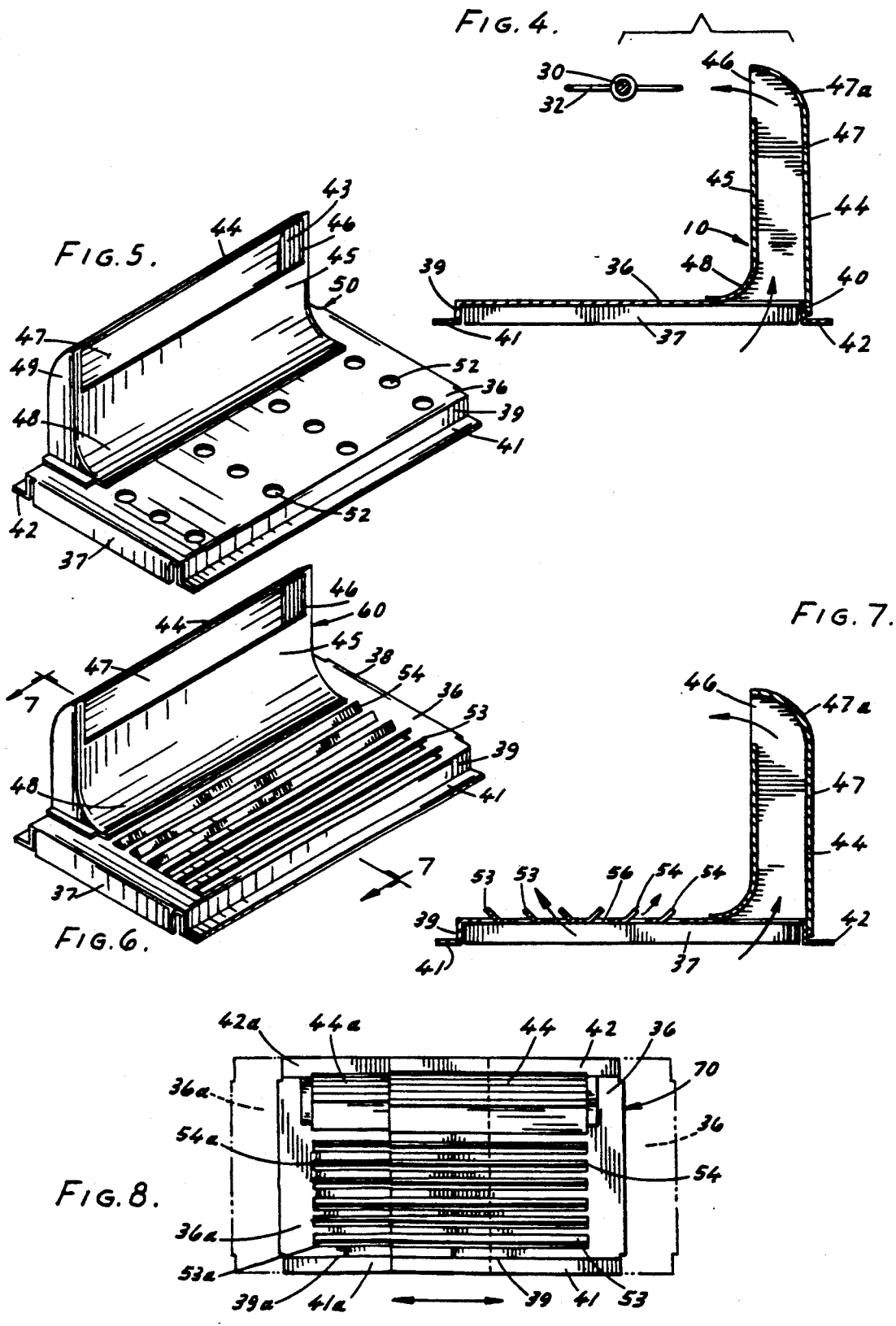

ROTISSERIE HEAT DIRECTING DEVICE

BACKGROUND OF THE INVENTION

This invention relates to a device which directs heat from a heat source in a barbecue grill to food items which are to be cooked on a rotisserie. More particularly, it relates to a heat directing device which has at least one heat duct portion extending from a base portion positioned over the heat source with the heat duct portion having an opening facing in the direction of the food on the rotisserie.

It is known in the prior art to provide burners at the back of a gas barbecue grill unit for use in conjunction with a rotisserie spit. These burners are disposed vertically and are described in U.S. Pat. No. 4,089,258 which has a refractory panel 48, and in U.S. Pat. No. 4,697,506 wherein briquettes are shown in a vertical firebox 80. U.S. Pat. Nos. 4,561,418 and 4,627,410 also show vertically mounted side panels with gas burners. In U.S. Pat. No. 3,547,097 a pivotal gas infrared burner is shown in conjunction with a rotisserie. U.S. Pat. Nos. 3,358,587; 3,832,989 and 4,619,190 all show vertical racks wherein charcoal is burned with a rotisserie being shown in the '587 and '989 patents. A vertically disposed self basting unit is shown in an oven in U.S. Pat. No. 1,964,372.

The prior art does not provide a heat directing device for use in a barbecue grill with a rotisserie which can direct heat from the normally positioned main burner unit so as to concentrate the heat on the food placed on the rotisserie. Neither does the prior art provide a heat directing device of the foregoing type which provides heating of the food from multiple directions as well as vaporization of the meat fat and juices to effect the usual smoky flavor to food. Neither does the prior art show adjustment of such heat directing devices to various sizes of grill units.

It is an advantage of the invention to provide a highly efficient heat directing device for use in conjunction with a rotisserie in a barbecue grill.

It is another advantage of the invention to provide a heat directing device of the foregoing type which replaces a back burner in a barbecue grill.

It is yet another advantage of the invention to provide a heat directing device of the foregoing type which can direct heat to food on a rotisserie from different directions.

It is still another advantage of the invention to provide a heat directing device of the foregoing type which is adaptable to various sizes of barbecue grills.

It is yet another advantage of the invention to provide a heat directing device of the foregoing type which can be manufactured at low cost.

SUMMARY OF THE INVENTION

The foregoing advantages are accomplished by the present high efficiency barbecue grill for use in conjunction with a rotisserie wherein the grill has a base member with supporting side walls. The barbecue grill includes a heat source supported by the base member and a rotisserie supported by the side walls. There is a heat directing device including a base portion positioned over the heat source with a hollow duct portion extending from the base portion. The duct portion terminates in an opening constructed and arranged to direct heat from the heat source in the direction of the food on the rotisserie.

In one embodiment, there is an additional hollow duct portion positioned opposite the hollow duct portion and extending from the base portion. The additional hollow duct portion terminates in an elongated opening constructed and arranged to direct heat from the heat source in the direction of the rotisserie and opposite the hollow duct portion. In one aspect, the opening of the hollow duct portion extends a greater distance from the base portion than the additional duct portion.

In a preferred embodiment, the base portion includes a floor member which includes vent holes or louvers and the opening in the duct is elongated.

In yet another preferred embodiment, the heat directing device is formed in at least two telescoping sections, with the telescoping sections constructed and arranged to provide lateral adjustment.

In one particular embodiment, there is a heat directing device for use in a barbecue grill which includes a base portion adapted to be positioned over the heat source with at least one hollow duct portion extending from the base portion with the duct portion terminating in an elongated opening constructed and arranged to direct heat from the heat source in the direction of food being cooked on the rotisserie.

BRIEF DESCRIPTION OF THE DRAWINGS

A better understanding of the present rotisserie heat directing device for barbecue grill will be accomplished by reference to the drawing wherein:

FIG. 4 is a sectional view taken along line 4—4 of FIG. 3.

FIGS. 5, 6, 9 and 11 are views similar to FIG. 3 showing alternative embodiments.

FIG. 7 is a view taken along line 7—7 of FIG. 6.

FIG. 8 is a top plan view illustrating yet another alternative embodiment.

DESCRIPTION OF THE EMBODIMENTS

Figure 1:
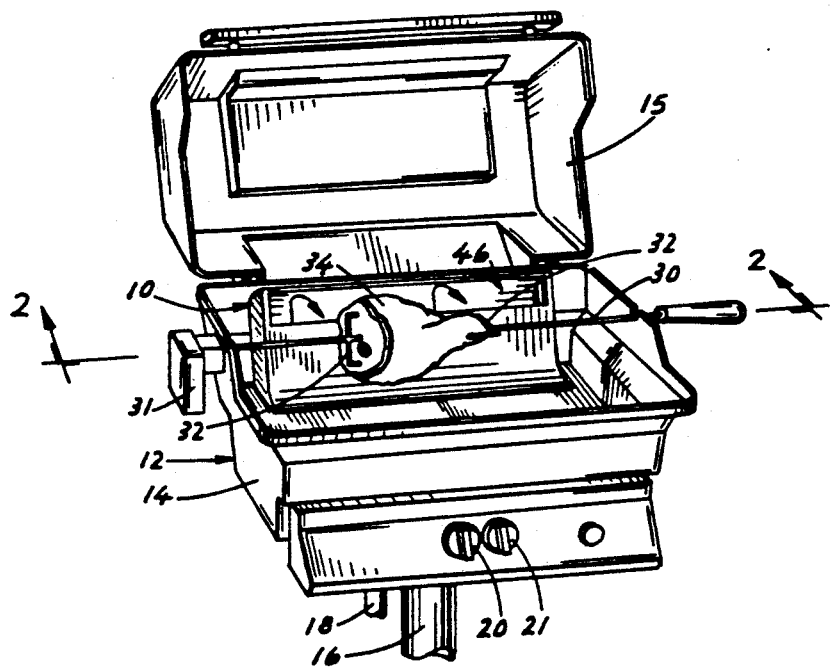
FIG. 1 is a front perspective view showing the heat directing device in a gas-fired barbecue grill.
Figure 2:
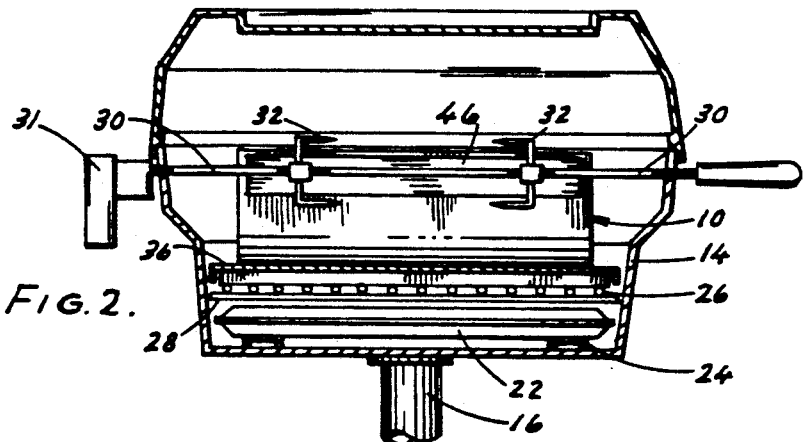
FIG. 2 is a sectional view taken along line 2—2 of FIG. 1.

With respect to FIGS. 1 and 2, the heat directing device generally 10 is shown in conjunction with gas-fired barbecue grill 12. The grill includes the usual cover member 15 and a base number 14 supported by a post 16. A gas inlet pipe 18 provides the usual source of fuel which is controlled by the control knobs 20 and 21 in conjunction with the usual valve and venturi members (not shown).

As seen in FIG. 2, a typical dual type gas burner 22 is shown supported by the feet 24 in the base 14 of barbecue grill 12. Positioned above the burner is the usual grate 26 supported on the usual ledges such as 28. Also supported on the base number 14 is a typical rotisserie rod 30 rotated by the usual motor 31 and having the oppositely positioned prongs 32 for engaging roast 34.

Figure 3:
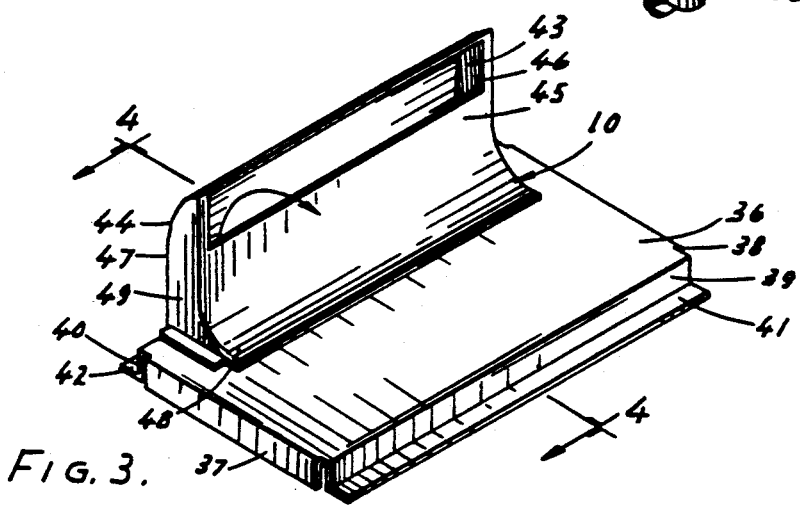
FIG. 3 is top perspective view showing the heat directing device.

Referring specifically to FIG. 3, the heat directing device 10 includes a base portion 36 including a floor member for placement directly over the grate 26 and consequently the burner 22. Extending from base portion 36 are the front and back walls 39 and 40 which have the lateral flanges 41 and 42 extending respectively therefrom. A hollow heat conveying duct 44 extends upwardly from the base 36 and is formed from the front wall 45 and the back wall 47 as well as the side walls 43 and 49. The front wall 45 joins the base portion 36 by an arcuate section 48. The upper end of the chute 44 has an elongated opening 46.

Returning to FIGS. 1 and 2, it is seen that the elongated opening 46 is positioned opposite the rotisserie rod 30 so as to direct heat against a side of the roast 34 and over the top thereof. As indicated in FIG. 4, the heat which emanates from the burner 22 is almost entirely captured within an enclosure formed by the base 36 at the top and the front and back walls 39 and 40 as well as the side walls 37 and 38. The heat then will rise up the hollow duct 44 and be concentrated therein to ultimately flow out of the elongated opening 46.

Referring to FIGS. 5, 6, 8, 9 and 11, there are shown alternative embodiments, generally 50, 60, 70, 80 and 90. The same component parts as previously described in conjunction with embodiment 10 are employed therein with the same reference numerals.

The difference in embodiment generally 50 over embodiment 10 is the presence of the vent holes 52 in the base portion 36. These vent holes will allow some heat to escape through the base and thus assist in cooking the roast 34 from the bottom.

Referring to FIG. 6, embodiment generally 60 has in the floor member of base portion 36 a series of louvers 53 and 54 which provide openings 56 through the base 36. They serve the same purpose as vent holes 52. It will be noted that louvers 53 face in the direction away from duct 44, whereas louvers 54 face toward the duct 44.

The embodiment generally 70 shown in FIG. 8 illustrates an adjustable feature for the heat directing device wherein a portion of the unit is made to telescope within the other and provide lateral adjustment for various sizes of barbecue grills. This is seen by the duct 44a, the base 36a, as well as the louvers 53a and 54a which are dimensioned to telescope respectively within the duct 44, the base 36, and the louvers 53 and 54. It will be appreciated that due to the slidable contact between the various telescoping members which will include the flanges 41 and 41a as well as 42 and 42a, that sufficient interengagement is made so that no additional fastening means need be employed to hold the respective portions in a stable condition.

Figure 10:
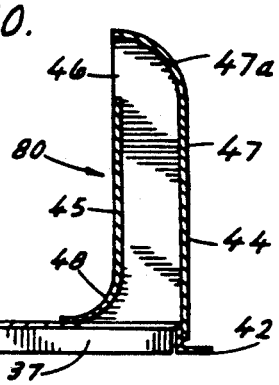
FIG. 10 is a view taken along line 10—10 of FIG. 9.
Figure 9:
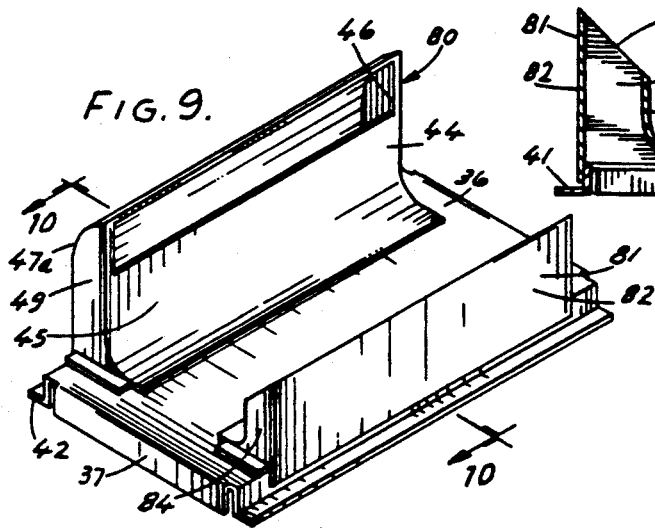

Referring to FIG. 9, embodiment generally 80 includes an additional chute or duct 81 which in a manner similar to duct 44 is composed of the front wall 82, back wall 83 and opposing side walls as represented by side wall 84. As illustrated in FIG. 10, this unit directs heat to the roast 34 in a horizontal direction from the opening 46 as well as from beneath the roast such as from angled opening 86.

Figure 11:
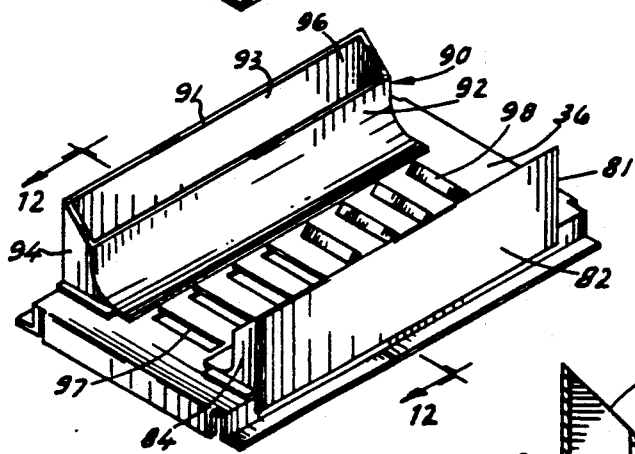
Figure 12:
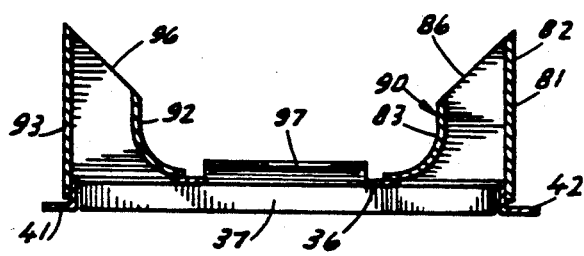
FIG. 12 is a view taken along line 12—12 of FIG. 11.

Referring to FIGS. 11 and 12, embodiment generally 90 has two opposing ducts 81 and 91 which are of the same height and have the upwardly angled openings 86 and 96 in the manner previously described for duct 81. As in the previous embodiment, duct 91 has the front wall 92, back wall 93, as well as two side walls, one of which is shown at 94. This unit thus would have the heat provided from beneath the roast 34 and at an angle thereto from both sides as well as allowing heat to be directed under the roast with heat escaping through the louvers 97 and 98. It will be seen that louvers 97 and 98 extend from the front to the back of unit 90 rather than from side to side as shown in conjunction with embodiments 60 and 70.

All of the embodiments presented herein provide a very efficient means for directing heat to food to be cooked on a rotisserie. As illustrated in FIG. 2, the heat directing device 10 is placed directly on the grate 26. No rock type material or briquettes are utilized as in the usual gas fired barbecue grill unit. This is due to the fact and, as previously explained, the base 36 serves this purpose. The grid upon which food is normally barbecued in a grill is removed so that the heat-collecting devices can be accommodated directly on the grate and directly above the burner 22. This affords efficient capture of the heat in the device for communication with the various chutes.

As is seen in the various embodiments, the rotisserie heat directing device of this invention is simple in its construction and easily fabricated. The preferred material for fabrication is stainless steel. However, porcelain coated metal could also be utilized. It will be appreciated that the typical smoke flavor acquired in barbecue cooking is obtained in the directing device of this invention by the fact of the fat and meat juices falling onto the base portion 36. Accordingly this surface serves two functions in that it allows the juices and fats to vaporize and to smoke as well as serving as a heat confinement so that the major quantity of heat will rise upwardly in the various ducts.

While the heat directing device of this invention has been described in conjunction with a gas barbecue grill, it can also be utilized in conjunction with any heat source in a barbecue grill such as a charcoal fired or electric grill.

While some of the various embodiments of the heat directing device of this invention employ a duct at the front of the device which is smaller than that in the back, this is merely to accommodate the cover on a grill. If a cover has a high front wall then the duct at the front could accordingly be made higher. Obviously, vent holes 52 or louvers 53, 54 and 97, 98 can be employed in the floor members with various combinations of the ducts 44, 81 and 91.

The foregoing invention can now be practiced by those skilled in the art. Such skilled persons will know this invention is not necessarily restricted to the particular embodiments presented herein. The scope of the invention to be defined by terms of the following claims as given meaning by the preceding description.

I claim:

1. A high efficiency barbecue grill for use in conjunction with a rotisserie wherein said grill has a base member with supporting side walls, said grill comprising;
   a heat source supported by said base member;
   a rotisserie supported by said side walls; and
   a heat directing device including a substantially flat base portion positioned and extending over said heat source, said base portion constructed and arranged to provide heat confinement and vaporization of meat juices and fats and a hollow duct portion on at least one portion of said base portion offset from said rotisserie extending upwardly from said base portion and in the direction of said rotisserie, said duct portion terminating in an opening constructed and arranged to direct heat from said heat source toward said rotisserie such that heat flows laterally over and above said base portion.

2. The barbecue grill as defined in claim 1 wherein said base portion includes a floor member with side walls and lateral flanges extending therefrom.

3. The barbecue grill as defined in claim 2 wherein said floor member includes vent holes.

4. The barbecue grill as defined in claim 2 wherein said floor member includes louvers.

5. The barbecue grill as defined in claim 1 wherein said heat directing device is formed in at least two telescoping sections, said telescoping sections constructed and arranged to provide adjustment.

6. The barbecue grill as defined in claim 1 wherein said heat source is a gas burner and said directing device is composed of stainless steel.

7. The barbecue grill as defined in claim 1 wherein said heat source is a gas burner and said directing device is composed of porcelain coated metal.

8. The barbecue grill as defined in claim 1 wherein said hollow duct portion is connected to said base portion by an arcuate section and said opening in said duct portion is elongated.

9. A high efficiency barbecue grill for use in conjunction with a rotisserie wherein said grill has a base member with supporting side walls, said grill comprising;
 a heat source supported by said base member;
 a rotisserie supported by said side walls; and
 a heat directing device including a base portion positioned over said heat source and a first hollow duct portion extending from said base portion, said duct portion terminating in an opening constructed and arranged to direct heat from said heat source in the direction of said rotisserie; and
 a second hollow duct portion positioned opposite said first hollow duct portion and extending from said base portion, said second hollow duct portion terminating in an opening constructed and arranged to direct heat from said heat source in the direction of said rotisserie and opposite said first hollow portion.

10. The barbecue grill as defined in claim 9 wherein said opening of said first hollow duct portion extends a greater distance from said base portion than said second duct portion.

11. A heat directing device for use in a barbecue grill, said grill having a heat source and a rotisserie supported by a base member of said grill, said heat directing device comprising:
 a substantially flat base portion adapted to be positioned and extended over said heat source and placed directly in contact with said grill, said base portion constructed and arranged to provide heat confinement and vaporization of meat juices and fats and a hollow duct portion positioned on at least one portion of said base portion and offset from said rotisserie when said base portion is placed on said grill, said base portion extending upwardly from said base portion, said duct portion terminating in an opening constructed and arranged to direct heat from said heat source in the direction of said rotisserie when said heat directing device is placed on said grill such that heat flows laterally over and above said base portion.

12. The heat directing device as defined in claim 11 wherein said base portion includes a floor member with side walls and lateral flanges extending therefrom.

13. The heat directing device as defined in claim 12 wherein said floor member includes vent holes.

14. The heat directing device as defined in claim 12 wherein said floor member includes louvers.

15. The heat directing device as defined in claim 11 wherein said heat directing device is formed in at least two telescoping sections, said telescoping sections constructed and arranged to provide adjustment.

16. The heat directing device as defined in claim 11 wherein said heat source is a gas burner and said directing device is composed of stainless steel.

17. The heat directing device as defined in claim 11 wherein said heat source is a gas burner and said directing device is composed of porcelain coated metal.

18. The heat directing device as defined in claim 11 wherein said hollow duct portion is connected to said base portion by an arcuate section and said opening in said duct portion is elongated.

19. A heat directing device for use in a barbecue grill, said grill having heat source and a rotisserie supported by a base member of said grill, said heat directing device comprising:
 a substantially flat base portion adapted to be positioned and extended over said heat source and placed directly in contact with said grill, said base portion constructed and arranged to provide heat confinement and vaporization of meat juices and fats and a first hollow duct portion positioned on one portion of said base portion extending upwardly from said base portion, said duct portion terminating in an opening constructed and arranged to direct heat from said heat source in the direction of said rotisserie; and
 a second hollow duct portion positioned of said base portion opposite said first hollow duct portion and extending upwardly from said base portion, said second hollow duct portion terminating in an opening constructed and arranged to direct heat from said heat source in the direction of said rotisserie and opposite said first hollow duct portion.

20. The heat directing device as defined in claim 19 wherein said opening of said first hollow duct portion extends a greater distance from said base portion than said second duct portion.

* * * * *